Nov. 30, 1948.  I. SHAKOWITZ  2,455,318
SLED
Filed Oct. 13, 1947  2 Sheets-Sheet 1
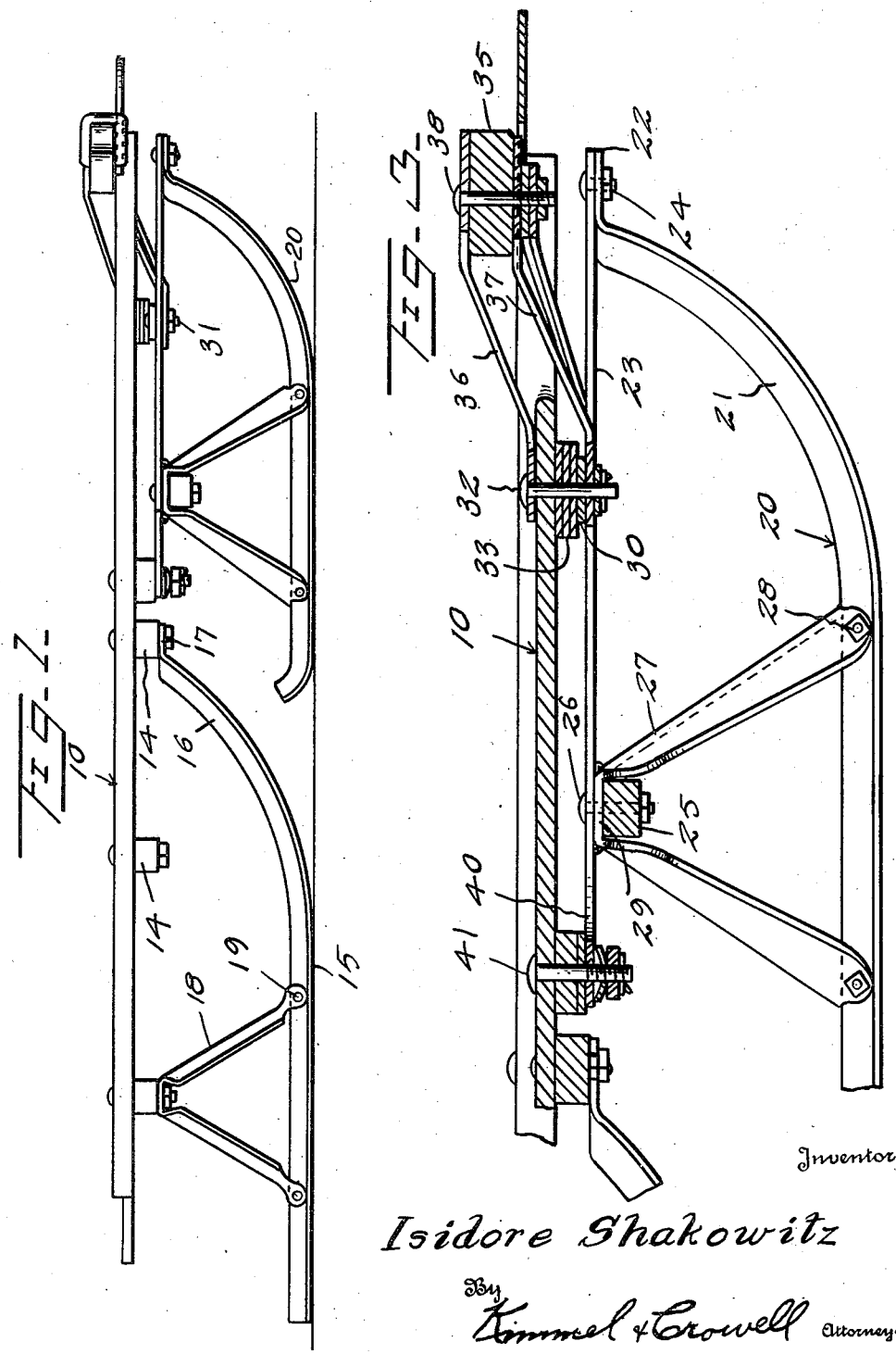
Inventor
Isidore Shakowitz
By Kimmel & Crowell Attorneys

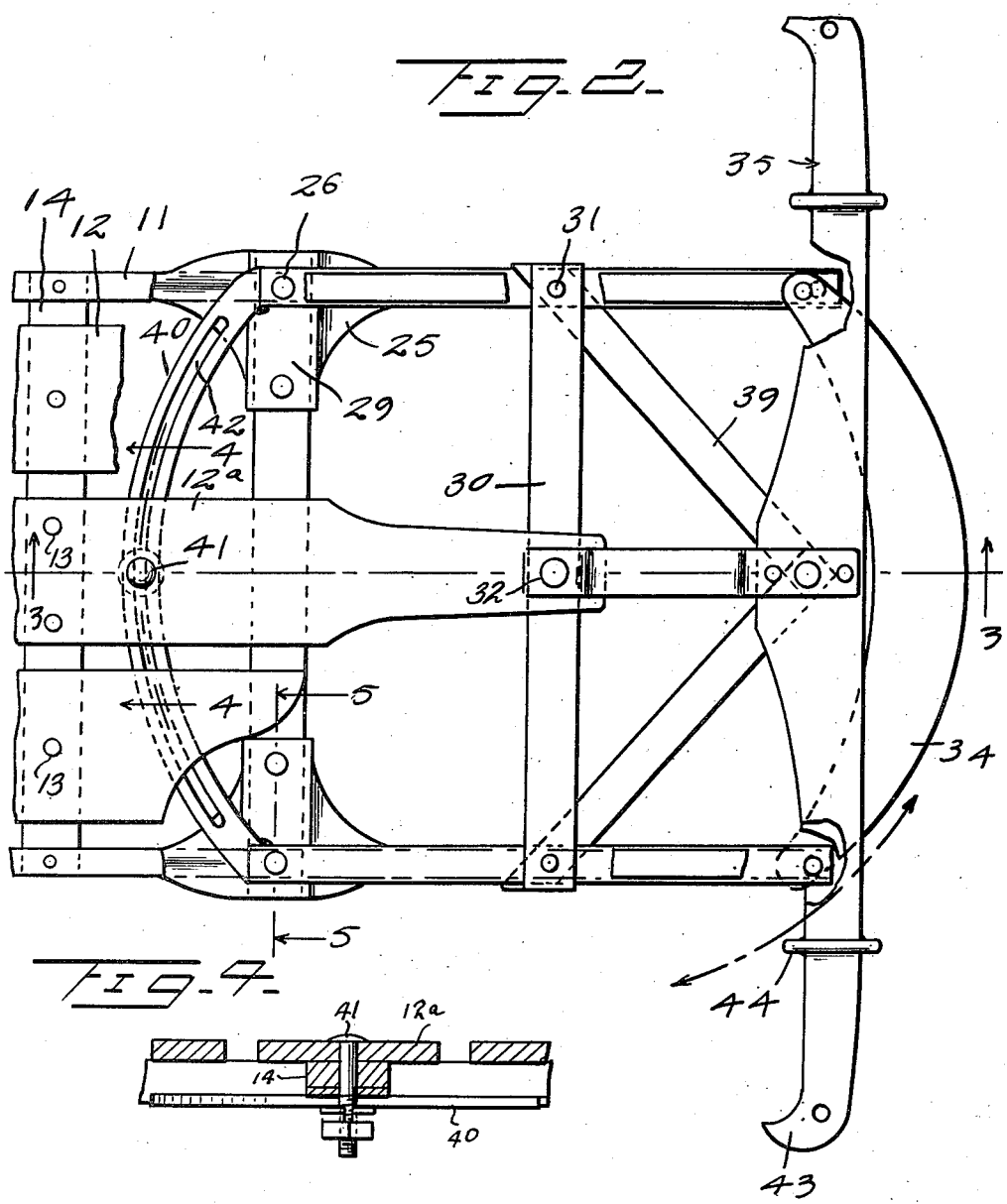

Patented Nov. 30, 1948

2,455,318

UNITED STATES PATENT OFFICE 2,455,318

SLED

Isidore Shakowitz, Philadelphia, Pa.

Application October 13, 1947, Serial No. 779,468

1 Claim. (Cl. 280—16)

This invention relates to sleds.

An object of this invention is to provide an improved sled for children which is of the steerable type and embodies two pairs of runners with one pair of runners pivotally secured to the top of the sled.

Another object of this invention is to provide an improved means whereby the steerable portion of the sled will be firmly and pivotally secured to the top of the sled.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation of a sled constructed according to an embodiment of this invention.

Figure 2 is a fragmentary plan view of the forward end of the sled.

Figure 3 is a fragmentary sectional view taken on the line 3—3 of Figure 2.

Figure 4 is a fragmentary sectional view taken on the line 4—4 of Figure 2.

Figure 5 is a fragmentary sectional view taken on the line 5—5 of Figure 2.

Referring to the drawings, the numeral 10 designates generally the top of a sled which is formed of outer side longitudinal bars 11 and inner longitudinal bars 12. The inner bars 12 are secured by fastening means 13 such as bolts or screws to cross bars 14 which are secured beneath the bars 12 and the bars 11. A pair of rear runners 15 are secured beneath the top 10 being formed with upwardly bent forward ends 16 terminating in a horizontal extension 17 which is secured beneath one of the cross bars 14. The runners 15 are also secured to a rearmost cross bar 14 by means of pairs of downwardly divergent supporting legs or braces 18 which are secured by any well known fastening means 19 to the webs of the runners 15 and are also secured beneath the rearmost cross bar 14. A forward pair of steerable runners 20 are disposed beneath the top 10, and form a forward steerable sled.

The runners 20 are provided with upturned forward ends 21 terminating in horizontal extensions 22 which are secured to longitudinal bars 23 by fastening means 24. The longitudinal bars 23 are connected together by means of a transverse connecting bar 25 which is secured beneath the longitudinal bars 23 by fastening means 26. A pair of downwardly divergent bracing or supporting legs 27 are secured at their lower divergent ends by fastening means 28 to the webs of the runners 20 and have their upper portions 29 interposed between the cross bar 25 and the lower sides of the longitudinal bars 23. A transverse bar 30 is secured between the side bars 23 being fixed thereto by fastening means 31.

A pivot member 32 extends through the top 10 at the forward end of the latter and also extends through the transverse bar 30 as shown in Figure 3. A plurality of thrust washers 33 are interposed between the bar 30 and the lower side of the top member 10. A longitudinally curved connecting bar 34 is fixed between the forward ends of the side bars 11 of the top and a steering bar 35 extends across the upper sides of the side bars 11 being fixedly secured between a pair of upwardly bent supporting bars 36 and 37 which are secured by fastening means 38 which may be a bolt and nut or up ended rivet at their forward ends to the center of the steering bar 35. The upper supporting bar 37 is interposed between the head of the pivot member 32 and the upper side of the top 10, whereas the lower supporting bar 37 is interposed at its rear end between the transverse bar 30 and the lower end of the pivot member 32. The steering bar 35 is also braced by means of a pair of rearwardly divergent bracing bars 39 which are fixed at their forward convergent ends to the steering bar fastening means 38 below the lower bar 37 and are fixed at their rear divergent ends beneath the fastening members 31. In order to prevent undue rocking of the steerable sled, I have provided a longitudinally curved bar or rod 40 which is fixed to the cross bar 25 by the fastening means 26. The center longitudinal bar 12a has extending therethrough a bolt 41 which extends through the slot 42 formed lengthwise in the bar 40. The steering bar 35 is formed with rearwardly directed opposite ends 43 and a rib 44 is carried by the steering bar 35 inwardly from each end thereof to prevent the foot of the user from slipping inwardly.

With a sled as hereinbefore described the user will be able to make sharper turns than with sleds embodying bendable runners and through the use of the slotted arcuate bar 40 the front sled member formed of the front runners 20 will be more firmly held to the top and the bar 40 will relieve the pivot 32 for the front sled member of undue strain.

I claim:

A bobsled comprising a flat top member, a pair of rear runners fixed beneath said top member, a front runner assembly including a pair of front runners, each having an upturned front portion and a horizontally disposed rear portion, an inverted V-brace secured to said rear portion and a horizontal bar secured at one end thereof to said upturned front portion and at the other end to said brace, a front transverse brace secured to each of said bars intermediate the length thereof, a rear transverse brace fixedly connected at the ends thereof to each of said first named braces, an arcuate transverse member connected at the ends thereof to said other ends of said horizontal bars and having a slot extending substantially the length thereof, two forwardly converging upraised steering braces secured at the rear thereof to said horizontal bars and at their front ends to each other and to a transverse steering bar, a pivot pin extending through the forward end of said flat top member rotatably carrying said front transverse brace, a pair of vertically spaced apart forwardly extending steering bar supports pivotally carried at the rear end thereof by said pin and at the other end non-rotatably fixed to said steering bar, and a second pin fixed in said flat top member and adapted to slidably engage in the slot of said arcuate member whereby said front runners are fixed relative to each other and rotatable relative to said top member, and said first and second named pins are effective to convey the load to said front runner assembly.

ISIDORE SHAKOWITZ.

REFERENCES CITED

The following references are of record in the file of this patent:

UNITED STATES PATENTS

| Number | Name | Date |
| --- | --- | --- |
| 705,943 | Miller | July 29, 1902 |
| 1,173,604 | Orcutt | Feb. 29, 1916 |
| 1,212,409 | Sherwood | Jan. 16, 1917 |